United States Patent
Niemelä et al.

(10) Patent No.: US 6,698,582 B2
(45) Date of Patent: Mar. 2, 2004

(54) BELT FOR THE THERMAL TREATMENT OF A CONTINUOUSLY OPERATED MATERIAL BED

(75) Inventors: Pekka Niemelä, Tornio (FI); Martti Jankkila, Tornio (FI); Eero Väänänen, Tornio (FI)

(73) Assignee: Outokumpu Oyj, Espoo (FI)

(*) Notice: Subject to any disclaimer, the term of this patent is extended or adjusted under 35 U.S.C. 154(b) by 0 days.

(21) Appl. No.: 10/182,284

(22) PCT Filed: Jan. 24, 2001

(86) PCT No.: PCT/FI01/00058
§ 371 (c)(1),
(2), (4) Date: Sep. 25, 2002

(87) PCT Pub. No.: WO01/55659
PCT Pub. Date: Aug. 2, 2001

(65) Prior Publication Data
US 2003/0054315 A1 Mar. 20, 2003

(30) Foreign Application Priority Data
Jan. 31, 2000 (FI) .............................................. 20000200

(51) Int. Cl.[7] .................................................. B65G 15/30
(52) U.S. Cl. .................. 198/844.1; 198/952; 198/689.1
(58) Field of Search ............................. 198/844.1, 952, 198/846, 689.1

(56) References Cited

U.S. PATENT DOCUMENTS

| | | | |
|---|---|---|---|
| 3,735,858 A | 5/1973 | Hartwig | |
| 3,756,380 A | 9/1973 | Ackroyd et al. | |
| 4,026,410 A | 5/1977 | Körting | |
| 4,261,181 A | * 4/1981 | Hofstetter | ............... 198/952 X |
| 4,316,718 A | 2/1982 | Drugge | |
| 5,651,191 A | * 7/1997 | Walunas et al. | ........ 198/952 X |

FOREIGN PATENT DOCUMENTS

| | | | |
|---|---|---|---|
| DE | 27 42 100 | 3/1979 | |
| JP | 60-144212 | * 7/1985 | ............... 198/844.1 |
| JP | 63-92513 | * 4/1988 | ............... 198/844.1 |

* cited by examiner

*Primary Examiner*—James R. Bidwell
(74) *Attorney, Agent, or Firm*—Smith-Hill and Bedell

(57) ABSTRACT

A conveyor belt for a continuously operated conveyor-type thermal treatment of a material bed includes metal conveyor belt elements that are connected to each other. Each conveyor belt element is formed with perforations in order to allow gas to flow through the conveyor belt. The perforations are distributed non-uniformly over the conveyor belt element and are located in at least two perforation zones. The perforation zones are separated from each other by perforation-free zones.

19 Claims, 3 Drawing Sheets

BELT FOR THE THERMAL TREATMENT OF A CONTINUOUSLY OPERATED MATERIAL BED

Figure 1:
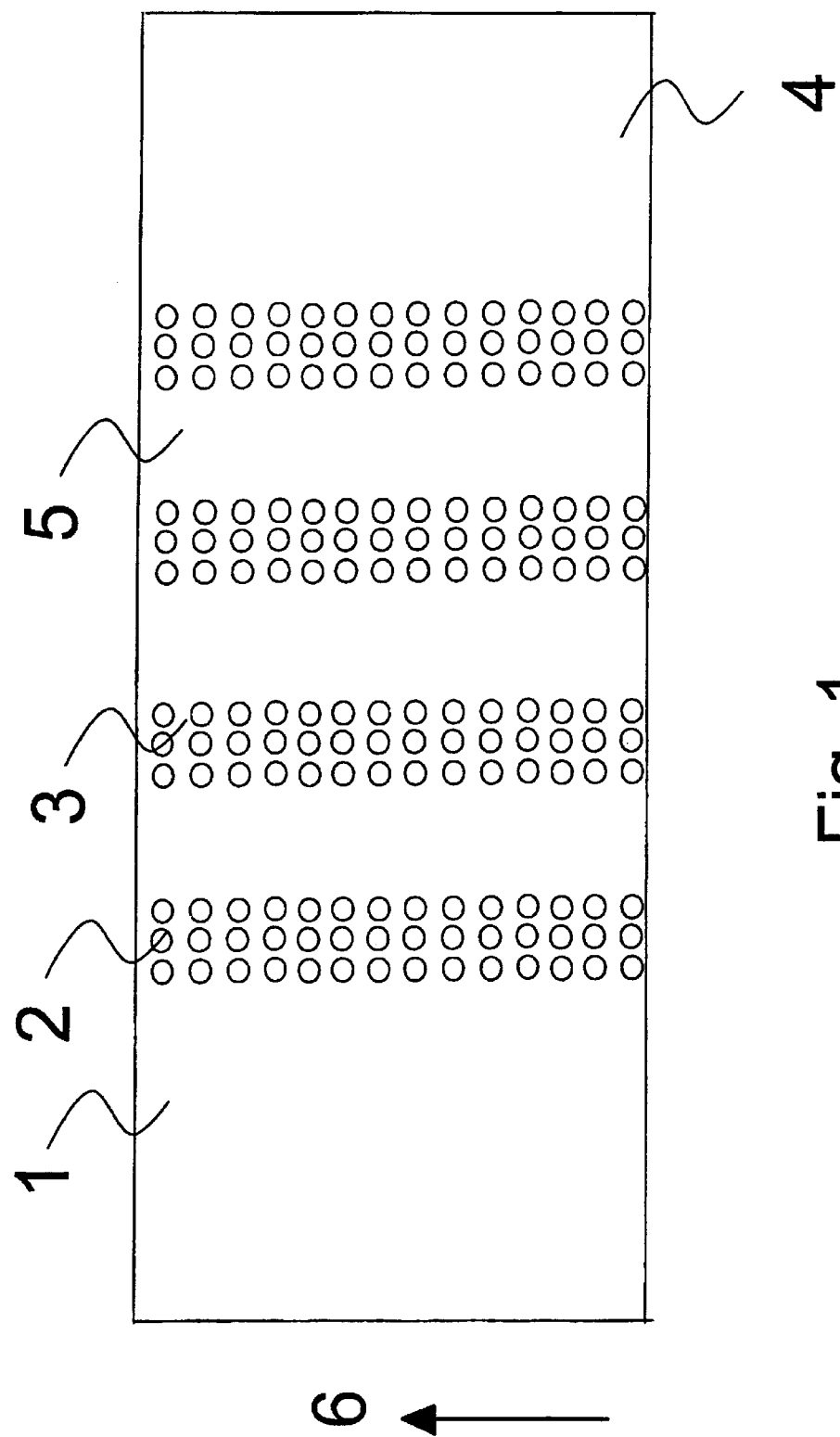

The present invention relates to a belt used in a continuously operated, conveyor-type thermal treatment of a material bed, i.e. in a sintering process, which belt is made of interconnected elements and provided with perforations for conducting the heating and possibly cooling gases to be fed in the material to be sintered advantageously through the material bed to be sintered and simultaneously through the belt.

In a continuously operated material sintering process, there is conducted hot gas through the material bed that is formed on the belt of the material to be sintered, which gas reacts with the material bed at a high temperature, for instance when the ferroalloy pellets form a material bed within the temperature range of 1,300–1,600° C., so that the soft particles to be sintered are hardened and are thus easy to be processed further. After the sintering proper, the sintered particles are cooled, and cooling gases are conducted in the material bed during the cooling process. Thus the belt is subjected to both heating and cooling within an essentially short length, which essentially raises the criteria for high-standard qualities required of the belt.

From the U.S. Pat. No. 4,316,718, there is known an endless, perforated conveyor belt used for heat-treating a bed of material by feeding hot gas through said material bed. Gas can be fed through the bed either from above the bed or from underneath it. When gas is fed from above, it first penetrates the material bed and proceeds through the elongate slots provided in the conveyor belt. The slots are made in the centre of the conveyor belt in adjacent rows that are spaced apart. The rows made of elongate slots are mutually arranged so that the rows fall transversally to the proceeding direction of the conveyor belt. When the belt wears off in the heat treatment of the material bed, the endless conveyor belt must always be replaced as a whole. This increases the expenses of the heat treatment of the material bed, because a perforated conveyor belt as such is expensive to manufacture. In addition, the replacing of a whole conveyor belt takes a lot of time, which cuts the working time of the apparatus.

The object of the present invention is to eliminate the drawbacks of the prior art and to achieve a conveyor belt suited for a continuously operated thermal treatment of a material bed, i.e. for a continuously operated conveyor-type sintering of the material bed, which conveyor belt is economical in manufacturing costs and can also be replaced in parts. The essential novel features of the invention are apparent from the appended claims.

According to the invention, the conveyor belt used in a continuously operated conveyor-type thermal treatment, i.e. sintering, of a material bed is made of interconnected, at least one-part elements, and in each element, at least in the part that is in contact with the material bed formed on the conveyor belt, there are made perforations for conducting the gas needed in the thermal treatment through the conveyor belt via said perforations. The elements constituting the conveyor belt are advantageously made of metal, such as ferritic, austenitic or acid-proof steel by rolling, so that the rolling direction is either transversal or parallel to the proceeding direction of the conveyor belt. The conveyor belt perforations are mutually arranged so that said perforations advantageously form a row that is either transversal or parallel to the proceeding direction of the conveyor belt or forms an angle with respect to the proceeding direction of the conveyor belt.

A single element of the conveyor belt according to the invention compiled of elements consists of one or several pieces. In particular, if the element is essentially a uniform piece along the whole width of the conveyor belt, the element is usually made of one piece, which is installed in the conveyor belt transversally to the proceeding direction of the conveyor belt. Even then several one-piece elements can be interconnected transversally to the proceeding direction of the conveyor belt prior to attaching the arrangement compiled of several pieces as part of the conveyor belt.

A conveyor belt element can also include several pieces arranged in parallel to the proceeding direction of the conveyor belt, which pieces are first interconnected in the lengthwise direction and further attached as part of the conveyor belt transversally to the proceeding direction thereof. When the element is formed of pieces that are arranged in parallel to the proceeding direction of the conveyor belt, said pieces can be made either essentially equally thick, or for instance such that at the outer edges of the conveyor belt, there are installed pieces that are either thicker or thinner than the pieces installed in the middle of the conveyor belt.

The number of the perforations provided in the conveyor belt element according to the invention is such that as regards the area of the element consisting of one or several pieces, the total area of the perforations is 20–60%, advantageously 35–40%. Moreover, said perforations are arranged in groups in the lateral direction of the conveyor belt, so that at both edges of the conveyor belt, there is provided an perforation-free zone having the width of 20–25% of the total width of the conveyor belt. In addition, the perforations provided in the middle section of the conveyor belt, in between the two perforation-free edge zones, are positioned so that in between two perforated zones, there is provided a perforation-free zone having a width that is equal to the width of the perforated zones. In the perforated zone, the perforations are placed in one or several rows in the lateral direction of the conveyor belt. As such, the rows formed by the perforations can follow either the lateral or the lengthwise direction of the conveyor belt, or they can form an angle of about 30–60 degrees with respect to the proceeding direction of the conveyor belt.

In shape, the perforation made in the conveyor belt element can be for example circular or oval, or it can have some other shape. A perforation that represents some other shape than circular is advantageously placed, with respect to the conveyor belt, so that the larger dimension of said perforation is positioned in the lateral direction of the conveyor belt. The perforation can also be placed in the conveyor belt so that the smaller dimension of said perforation is positioned in the lateral direction of the conveyor belt. When the perforation represents some other shape than circular, the ratio of the perforation dimensions is advantageously within the range 0.1–0.5.

In a conveyor belt according to the invention, the perforated zone is made of mutually identical perforations that are advantageously arranged in one or several rows, and in each row the perforations are spaced apart. A perforated zone may also be formed of mutually different perforations, advantageously so that mutually identical perforations are arranged in their own rows, and other different perforations again in their own rows. The obtained different rows can advantageously be arranged for instance in an alternating fashion.

A conveyor belt element according to the invention is connected to another element in order to compile the conveyor belt proper advantageously in a mechanical fashion, such as by welding the conveyor belt in the lateral direction of the conveyor belt, i.e. transversally to the proceeding direction thereof. The junction can also be realised so that at one lateral edge of the conveyor belt element, there is installed at least one mechanical connecting piece, and at another lateral edge of the conveyor belt element, there is installed another mechanical connecting piece in order to create the junction.

Figure 2:
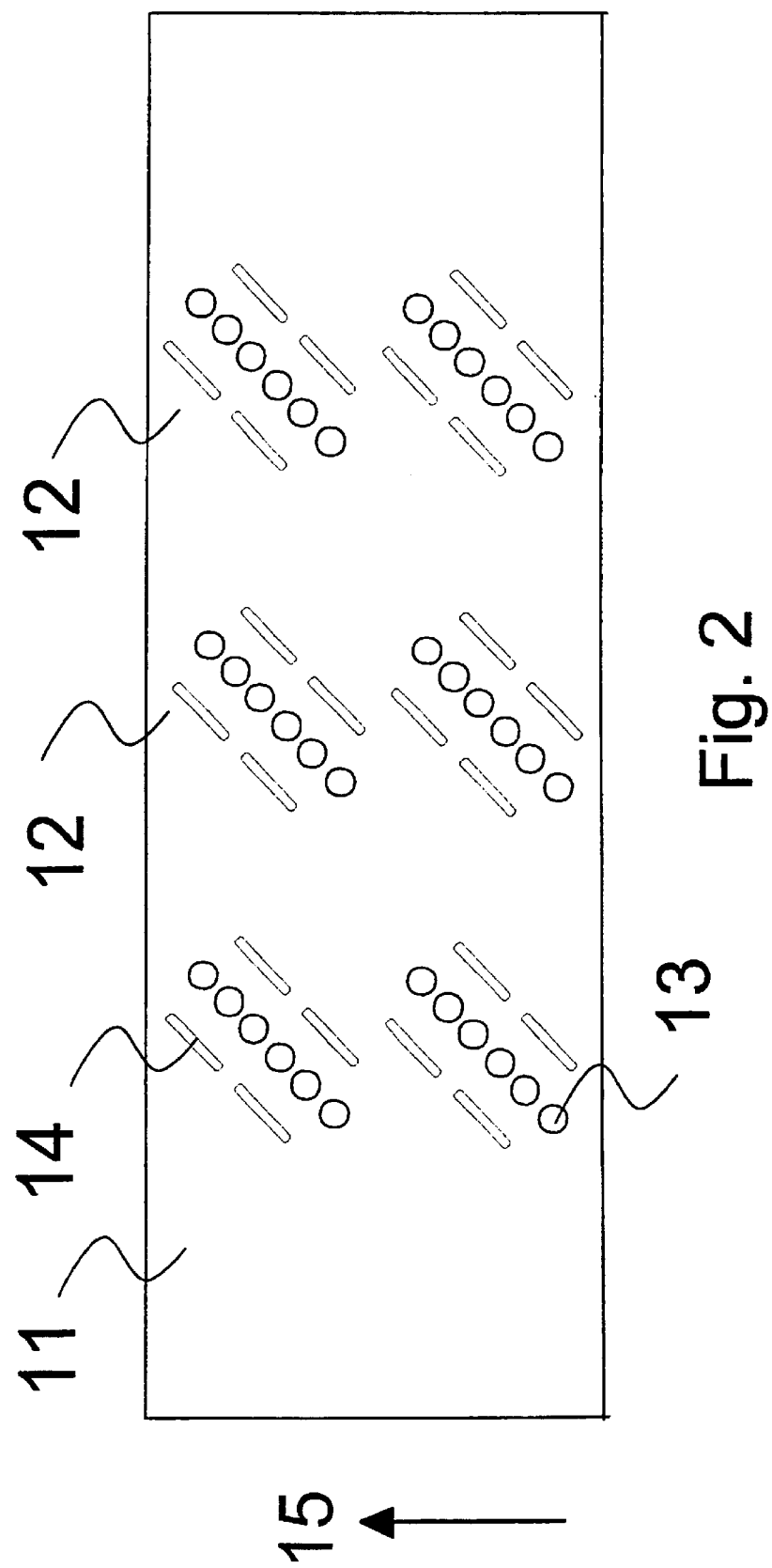
Figure 3:
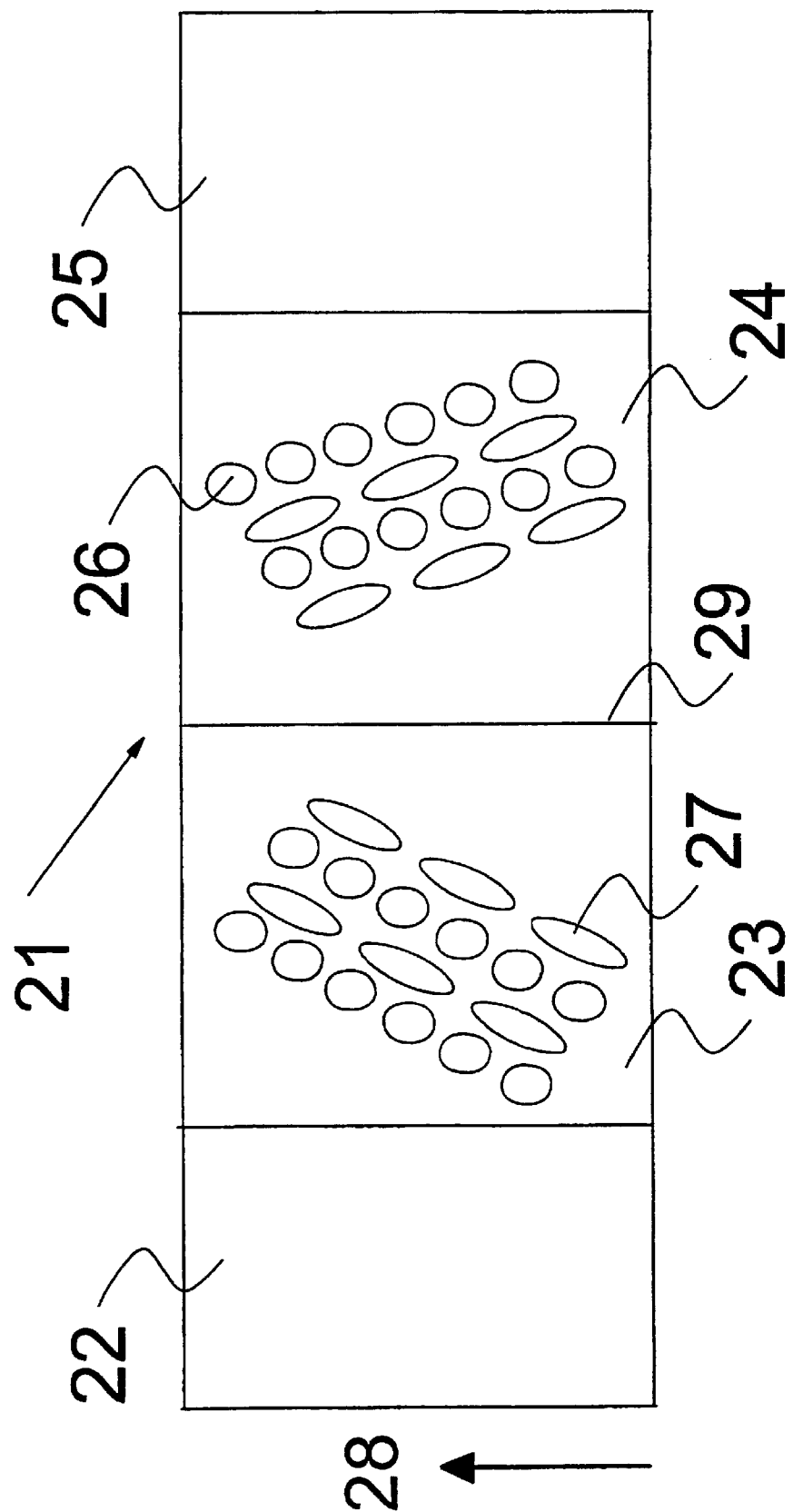

The invention is explained in more detail with reference to the appended drawings, where FIG. 1 is a top-view illustration of a preferred embodiment of the invention, FIG. 2 is a top-view illustration of another preferred embodiment of the invention, and FIG. 3 is a top-view illustration of a third preferred embodiment of the invention.

According to FIG. 1, in a conveyor belt designed for a continuously operated sintering of a material bed, a conveyor belt element 1 consists of a one-part metal object made of for instance ferritic steel, in which element there are made perforations 2 in order to allow the gases that are used in the sintering process to flow through the element 1. The perforations 2 are made in the element in zones 3, so that in the element 1, there is arranged a perforation-free edge zone 4 at both edges of said conveyor belt element 1. In similar fashion, in between the perforated zones 3, there is placed a perforation-free zone 5. The perforations 2 are arranged in the element 1, so that the perforations 2 form several rows in parallel to the proceeding direction 6 of the conveyor belt element 1.

FIG. 2 illustrates a conveyor belt element 11 designed for a continuously operated sintering of a material bed, said element 11 consisting of a one-part metal object made for instance of austenitic steel and provided with perforations in zones 12. Said zones include perforations 13 and 14 with different shapes. The shapewise mutually identical perforations 13 are positioned in a row in similar fashion as the mutually identical perforations 14. The perforations 13 and 14 are arranged at an angle of 45 degrees with respect to the proceeding direction 15 of the conveyor belt element 11.

According to FIG. 3, a conveyor belt element 21 designed for a continuously operated sintering of a material bed consists of a multi-part metal object, lengthwise in the proceeding direction of the conveyor belt, with parts 22, 23, 24 and 25 interconnected by welding. The material of the parts 22 and 25 is for instance austenitic steel, whereas the material of the parts 23 and 24 is for instance acid-proof steel. The parts 22 and 25 of the metal object constitute the edge parts of the element 21. The parts 23 and 24 of the metal object are provided with perforations 26 and 27 that allow gases to flow through the element 21. The perforations 26 are mutually identical in shape, and respectively the perforations 27 are mutually identical in shape. The perforations 26, and respectively the perforations 27, are arranged in rows that form an angle of 45 degrees with the proceeding direction of the conveyor belt. On the other hand, the perforation rows 26 and respectively 27, placed on different sides of the centre line 29 of the conveyor belt element 21, are positioned mutually symmetrically.

What is claimed is:

1. A conveyor belt for a continuously operated conveyor-type thermal treatment of a material bed, the conveyor belt comprising a plurality of metal conveyor belt elements that are connected to each other, wherein each conveyor belt element is formed with perforations in order to allow gas to flow through the conveyor belt, the perforations are distributed non-uniformly over the conveyor belt element and are located in at least two perforation zones, and the perforation zones are separated from each other by perforation-free zones.

2. A conveyor belt according to claim 1, wherein a perforation-free zone extends in the conveying direction of the conveyor belt.

3. A conveyor belt according to claim 1, wherein each conveyor belt element has two opposite transverse edges at which the conveyor belt element is connected to other conveyor belt elements of the conveyor belt and has two opposite longitudinal edges that are substantially perpendicular to the transverse edges, and the perforation zones are elongated and are spaced apart in a direction substantially parallel to the transverse edges of the conveyor belt element.

4. A conveyor belt according to claim 1, wherein each conveyor belt element has two opposite transverse edges at which the conveyor belt element is connected to other conveyor belt elements of the conveyor belt and has two opposite longitudinal edges that are substantially perpendicular to the transverse edges, and the perforation-free zones are elongated and extend substantially parallel to the longitudinal edges of the conveyor belt element.

5. A conveyor belt according to claim 1, wherein each conveyor belt element has two opposite transverse edges at which the conveyor belt element is connected to other conveyor belt elements of the conveyor belt and has two opposite longitudinal edges that are substantially perpendicular to the transverse edges, and the perforation zones are elongated and are substantially parallel to the longitudinal edges of the conveyor belt element.

6. A conveyor belt according to claim 1, wherein each conveyor belt element has two opposite transverse edges at which the conveyor belt element is connected to other conveyor belt elements of the conveyor belt and has two opposite longitudinal edges that are substantially perpendicular to the transverse edges, and the perforation zones are elongated and are disposed at an angle of about 30–60° to the longitudinal edges of the conveyor belt element.

7. A conveyor belt according to claim 6, wherein the perforation zones are disposed at an angle of about 45° to the longitudinal edges of the conveyor belt element.

8. A conveyor belt according to claim 1, wherein each conveyor belt element has two opposite transverse edges at which the conveyor belt element is connected to other conveyor belt elements of the conveyor belt and has two opposite longitudinal edges that are substantially perpendicular to the transverse edges, the conveyor belt element has two edge zones adjacent the longitudinal edges respectively of the conveyor belt element, the perforation zones are located between the edge zones, and the edge zones are perforation-free.

9. A conveyor belt according to claim 1, wherein the area of the perforations is about 20–60% of the total area of the conveyor belt element.

10. A conveyor belt according to claim 1, wherein the conveyor belt element comprises a single piece of metal.

11. A conveyor belt according to claim 10, wherein the metal comprises austenitic steel or ferritic steel or acid-proof steel.

12. A conveyor belt according to claim 1, wherein the conveyor belt element comprises multiple metal components that are connected together.

13. A conveyor belt according to claim 12, wherein the metal components are interconnected by welding.

14. A conveyor belt according to claim 12, wherein the metal components comprise austenitic steel, ferritic steel or acid-proof steel.

15. A conveyor belt according to claim 1, wherein the perforations are essential identical in shape.

16. A conveyor belt according to claim 1, wherein the perforations in a perforation zone are in at least first and second sets, the perforations of the first set are essentially identical to each other in shape, the perforations of the second set are essentially identical to each other in shape, and the perforations of the second set are different in shape from the perforations of the first set.

17. A conveyor belt according to claim 1, wherein the perforations in a perforation zone are in a row that extends substantially parallel to the conveying direction of the conveyor belt.

18. A conveyor belt according to claim 1, wherein the perforations in a perforation zone are arranged in a row at an angle of 30–60° with respect to the conveying direction of the conveyor belt.

19. A conveyor belt according to claim 1, wherein the perforations are positioned substantially symmetrically with respect to a center line of the conveyor belt element.

* * * * *